Patented Aug. 6, 1935

2,010,111

UNITED STATES PATENT OFFICE 2,010,111

CELLULOSE ESTERS AND METHOD OF MAKING THE SAME

George Schneider, Montclair, N. J., assignor to Celanese Corporation of America, a corporation of Delaware No Drawing. Application October 7, 1933, Serial No. 692,621

15 Claims. (Cl. 260—102)

This invention relates to the preparation of cellulose esters and relates more particularly to the precipitation of cellulose acetate or other organic ester of cellulose from solutions in a more desirable form.

An object of my invention is to precipitate organic esters of cellulose from solutions of the same in such a manner that fluffy fibres are formed. A further object of my invention is to add a precipitating agent to a solution of an organic ester of cellulose under such conditions that a lofty or voluminous precipitate is formed. Other objects of this invention will appear from the following detailed description.

In the making of cellulose acetate by the so-called solution method, cellulose is acetylated by means of acetic anhydride and a catalyst in the presence of large amounts of acetic acid which dissolves the cellulose acetate that is formed to produce a very heavy viscous solution. This solution, usually after hydrolysis or ripening to develop the desired solubility characteristics, is then streamed or poured into water which dilutes the acetic acid to such an extent that it is no longer capable of holding the cellulose acetate in solution, with the result that the cellulose acetate precipitates. However, since the solution of cellulose acetate is very viscous, the water acts on the particles or streams thereof to precipitate the outer layers of the same to produce a sort of case-hardening effect, with the result that often the acid used as catalyst or as reagent becomes trapped within the particles and cannot be thoroughly removed by washing. Moreover the particles are relatively hard and require a long period of mixing with solvents in order to form solutions.

I have found that if water or other precipitating agent is added to the solution of the organic ester of cellulose, preferably under vigorous stirring, the organic ester of cellulose may be precipitated in the form of soft fibres. A still more lofty or voluminous precipitate may be formed if gas is injected into or generated within the viscous solution of the organic ester of cellulose so that gas permeates the solution in the form of fine bubbles throughout the mass thereof, and then water or other precipitant is added to the mass.

Organic ester of cellulose precipitated in this manner is in the form of soft, voluminous fibres that may be freed readily from impurities such as catalysts or other reagents used in their formation by washing. Moreover such cellulose esters, because of their voluminous form may be dissolved in solvents quite readily to form solutions for making artificial filaments, films, foils, plastic masses, etc., thus permitting a saving in cost and equipment and labor.

In accordance with my invention, then, I prepare voluminous fibres of organic ester of cellulose from solutions of the same, preferably while they contain a gas entrapped therein, by adding a precipitant therefor.

While this invention is of particular importance in connection with the treatment of cellulose acetate, it is applicable to the treatment of other organic esters of cellulose such as cellulose formate, cellulose propionate and cellulose butyrate.

While the cellulose acetate or other organic ester of cellulose may be precipitated in accordance with this invention from any solution, such as for instance solutions formed by dissolving a prepared cellulose acetate in suitable solvents, it is particularly important in connection with the precipitation of organic esters of cellulose from esterifying mixtures, that is to say from solutions formed by the esterification of cellulose by means of formic acid, or the anhydride or chloride of acetic acid, propionic acid, butyric acid and the like in the presence of a catalyst such as sulfuric acid, phosphoric acid or other acid catalyst, and also in the presence of a sufficient amount of solvent, such as acetic acid, propionic acid, butyric acid, etc. to cause the resulting cellulose ester to dissolve to form a heavy viscous solution of the consistency of molasses.

The solution of the organic ester of cellulose preferably is caused to assume a more voluminous form by the incorporation therein of bubbles of air, carbon dioxide, nitrogen or other inert gas. In one form of this invention such gas may be introduced or injected into the heavy syrupy solution with stirring to cause the bubbles thereof to become entrapped.

In another form of my invention, a gas is generated within the solution of the organic ester of cellulose. For instance a carbonate or bicarbonate, such as the carbonate of sodium, ammonium, potassium, barium, magnesium, calcium, etc. or the bicarbonate of sodium or potassium, may be added to the solution resulting from the esterification of the cellulose, which solution contains an acid such as sulfuric acid or phosphoric acid, in quantities sufficient to neutralize the same with stirring so that the carbon dioxide that is liberated is retained in the solution in the form of bubbles.

While water is preferred as the precipitant to cause the precipitation of the organic ester of cellulose from the solution of the same, other precipitants may be employed such as benzol or ethyl ether in the case of the precipitation of cellulose acetate.

Preferably the water or precipitant is added slowly with stirring until the precipitation point is reached, which water may be at room temperatures or may be slightly heated or warmed, say up to 50° C., and then a further and large quantity of water is added during vigorous stirring to form the voluminous, soft, fibrous precipitate.

In order further to illustrate my invention, but without being limited thereto the following specific example is given.

*Example*

A solution of cellulose acetate, which is formed by reacting cellulose with acetic anhydride in the presence of sulfuric acid as catalyst and acetic acid as solvent diluent, has water added thereto and is ripened or hydrolyzed until the cellulose acetate is soluble in acetone.

The resulting solution may comprise for instance 500 parts by weight of cellulose acetate, 1600 parts by weight of acetic acid of 93% concentration, and 50 parts by weight of sulfuric acid (98% concentration), and is in the form of a heavy, viscous syrupy solution. A freshly prepared concentrated aqueous solution or slurry of 85.5 parts by weight of sodium bicarbonate is thoroughly beaten into the solution to form a mass of a creamy consistency.

Thereupon warm water is slowly added to the mass with stirring. The amount of water added at this stage closely approaches, but does not equal that required to cause precipitation of the cellulose acetate. The amount of water required for this purpose varies with the degree of hydrolysis of the cellulose acetate. After this, water is added in large amounts and at a fast rate with vigorous stirring of the mass.

The cellulose acetate precipitates in the form of fluffy, light fibres, which may be easily purified by washing with water, and/or stabilized by boiling with water containing a small amount of mineral acid such as sulfuric acid.

When the warm water is first beaten into the creamy mass to which the sodium bicarbonate has been added, the carbon dioxide formed by the reaction between the sulfuric acid and the sodium bicarbonate is liberated, but is enclosed largely by the viscous solution of the cellulose acetate in the acetic acid and produces a porous mass of low density, as is evidenced by the fact that the mass swells in a manner similar to the raising of dough in bread making.

It is to be understood that the foregoing detailed description is given merely by way of illustration and many variations may be made therein without departing from the spirit of my invention.

Having described my invention, what I desire to secure by Letters Patent is:

1. The method of precipitating cellulose derivative from a solution of the same comprising slowly adding a precipitant for the cellulose derivative to a solution thereof in amounts not quite sufficient to cause precipitation and then quickly adding thereto a large amount of such precipitant to cause rapid precipitation of the cellulose derivative.

2. The method of precipitating cellulose acetate from a solution of the same comprising slowly adding a precipitant for the cellulose acetate to a solution thereof in amounts not quite sufficient to cause precipitation and then quickly adding thereto a large amount of such precipitant to cause rapid precipitation of the cellulose acetate.

3. The method of precipitating cellulose derivative comprising incorporating bubbles of a gas in a viscous solution of the cellulose derivative and then precipitating the cellulose derivative by adding to the solution a precipitant in amount sufficient to cause precipitation of the cellulose derivative in voluminous form.

4. The method of precipitating cellulose acetate comprising incorporating bubbles of a gas in a viscous solution of the cellulose acetate and then precipitating the cellulose acetate by adding to the solution a precipitant in amount sufficient to cause precipitation of the cellulose acetate in voluminous form.

5. The method of precipitating organic esters of cellulose from a solution formed by the esterification of cellulose in the presence of a solvent for the organic ester of cellulose comprising incorporating bubbles of a gas in such solution, and then precipitating the organic ester of cellulose by adding to the solution a precipitant in amounts sufficient to cause precipitation of the organic ester of cellulose in voluminous form.

6. The method of precipitating cellulose acetate from a solution formed by the esterification of cellulose in the presence of a solvent for the cellulose acetate comprising incorporating bubbles of a gas in such solution, and then precipitating the cellulose acetate by adding to the solution a precipitant in amounts sufficient to cause precipitation of the cellulose acetate in voluminous form.

7. The method of precipitating organic esters of cellulose from a solution formed by the esterification of cellulose in the presence of a solvent for the organic ester of cellulose comprising incorporating bubbles of a gas in such solution by adding a carbonate adapted to react with the acid present in such solution, and then precipitating the organic ester of cellulose by adding to the solution a precipitant in amounts sufficient to cause precipitation of the organic ester of cellulose in voluminous form.

8. The method of precipitating cellulose acetate from a solution formed by the esterification of cellulose in the presence of a solvent for the cellulose acetate comprising incorporating bubbles of a gas in such solution by adding a carbonate adapted to react with the acid present in such solution, and then precipitating the cellulose acetate by adding to the solution a precipitant in amounts sufficient to cause precipitation of the cellulose acetate in voluminous form.

9. The method of precipitating cellulose acetate from an acetylation solution containing acetic acid and acid catalyst comprising adding thereto a substance capable of reacting with the acid to form a gas and then adding a sufficient amount of water to the solution to cause precipitation of the cellulose acetate.

10. The method of precipitating cellulose acetate from an acetylation solution containing acetic acid and acid catalyst comprising adding thereto a carbonate and then adding a sufficient amount of water to the solution to cause precipitation of the cellulose acetate.

11. The method of precipitating cellulose acetate from an acetylation solution containing acetic acid and acid catalyst comprising adding thereto a bicarbonate and then adding a sufficient amount of water to the solution to cause precipitation of the cellulose acetate.

12. The method of precipitating cellulose acetate from an acetylation solution containing acetic acid and acid catalyst comprising adding thereto a carbonate or bicarbonate capable of reacting with the acid to form carbon dioxide, slowly adding water thereto in amounts not quite sufficient to cause precipitation of the cellulose acetate and then quickly adding a large amount of water with vigorous stirring to cause precipitation of the cellulose acetate in the form of fluffy fibres.

13. The method of precipitating cellulose acetate from an acetylation solution containing acetic acid and a mineral acid catalyst comprising adding thereto a carbonate or bicarbonate in amounts to neutralize the mineral acid present, slowly adding water thereto in amounts not quite sufficient to cause precipitation of the cellulose acetate and then quickly adding a large amount of water with vigorous stirring to cause precipitation of the cellulose acetate in the form of fluffy fibres.

14. Derivatives of cellulose in the form of light, fluffy fibres produced by precipitation of the derivative of cellulose from a solution of the same by addition thereto of a precipitating agent while such solution contains bubbles of a gas.

15. Cellulose acetate in the form of light, fluffy fibres produced by precipitation of the cellulose acetate from a solution of the same by addition thereto of a precipitating agent while such solution contains bubbles of a gas.

GEORGE SCHNEIDER.